United States Patent [19]

Chang et al.

[11] Patent Number: 5,197,038
[45] Date of Patent: Mar. 23, 1993

[54] METHOD AND SONIC TOOL APPARATUS FOR INVESTIGATING PROPERTIES OF EARTH FORMATIONS TRANSVERSED BY A BOREHOLE

[75] Inventors: Shu K. Chang, West Redding, Conn.; Michel Gouilloud, Paris, France

[73] Assignee: Schlumberger Technology Corporation, New York, N.Y.

[21] Appl. No.: 719,227

[22] Filed: Jun. 21, 1991

[51] Int. Cl.$^5$ .............................................. G01V 1/40
[52] U.S. Cl. ...................................... 367/28; 367/30; 367/73
[58] Field of Search ...................... 367/25, 28, 29, 30, 367/73, 86; 364/422, 421

[56] References Cited

U.S. PATENT DOCUMENTS

| | | | |
|---|---|---|---|
| 4,210,965 | 7/1980 | Ingren ...................................... | 367/30 |
| 4,398,273 | 6/1983 | Thompson et al. .................... | 367/73 |
| 5,081,612 | 1/1992 | Scott et al. ............................ | 367/38 |

OTHER PUBLICATIONS

Western Geophysical brochure, "SLIM, Seismic Lithologic Modeling," 1983.
"The effect of the invaded zone on full wavetrain acoustic logging" by L. J. Baker; Geophysics, vol. 49, No. 6 (Jun. 1984) pp. 796–809.
"Acquisition and Analysis of Sonic Waveforms from a Borehole Monopole & Dipole Source for the Determination of Compress . . . " A. R. Harrison et al. SPE 20557, 65th Annual Technical Conf. and Exhib. of the SPE, New Orleans, La., Sep. 23–26, 1990.
"A Case Study of Shale and Sandstone Alteration Using a Digital Sonic Tool", Preceddings of SPWLA 26th Annual Logging Symposium; Dallas, Tex., Jun. 17–20, 1985 Brian Hornby et al.
"A New Sonic Array Tool for Full Waveform Logging" by C. F. Morris et al., SPE 13285, 59th Annual Technical Conf. and Exhib., Houston, Tex., Sep. 16–19, 1984.
"Sand Stress Around a Wellbore", SPE 9650, Middle East Oil Technical Conf. of the Society of Petroleum Engineers in Manama, Bahrain, Mar. 9–12, 1981.
"Acoustic Waves From an Impulsive Source in a Fluid Filled Borehole", W. L. Roever et al. Journal of the Acoustical Society of America, vol. 55, No. 6, pp. 114–1157.
"A Ray Model for Head Waves in a Fluid-Filled Borehole" by David Scheibner, Rice University, Dept. of Elect, Engineering Apr. 1982.
"Space-Time Dependence of Acoustic Waves in a Borehole" by Michael Schoenberg, Journal of the Acoustical Society of America, vol. 70, No. 12, 1981, pp. 1496–1507.
"Numerical Evaluation of the Transient Acoustic Waveform Due to a Point Source in a Fluid-Filled Borehole", by L. Tsang, Geophyscis, vol. 44, No. 10, 1979, pp. 1706–1720.
"Effects of Borehole Alteration on Amplitudes of Full-Waveform Acoustic Logs" by K. Tubman, Borehole Geophysics II, Extended Abstract, SEG 55th Annual Meeting, Washington, D.C., Oct. 6–10, 1985, pp. 44–46.
"Computed Response to an Acoustic Logging Tool" by J. E. White et al., Geophysics, vol. 33, No. 2, 1968, pp. 302–310.

*Primary Examiner*—Ian J. Lobo
*Attorney, Agent, or Firm*—David P. Gordon; Marc D. Foodman

[57] ABSTRACT

Methods are provided which utilize a sonic tool for quantitatively determining parameters of a velocity profile of an altered zone in a rock formation traversed by a borehole. Synthetic amplitude information for the formation is generated by a computer model, by providing the computer with a proposed velocity profile for the formation, including values for parameters such as the radius of the altered zone and the acoustic velocities in the altered zone. The synthetic amplitude information is then compared with amplitude information (e.g. peak or total energy) of a compressional headwave as measured by the array sonic tool. If the comparison provides differences exceeding predetermined thresholds, the values for the parameters of the model are adjusted according to a least squares fit procedure until suitable values are found. The suitable values are then taken as the parameter values.

30 Claims, 4 Drawing Sheets

METHOD AND SONIC TOOL APPARATUS FOR INVESTIGATING PROPERTIES OF EARTH FORMATIONS TRANSVERSED BY A BOREHOLE

BACKGROUND

This invention relates generally to methods utilizing sonic tools for investigating the properties of earth formations traversed by a borehole. More particularly, this invention relates to the investigation of the velocity profile and extent of a perturbed zone surrounding a borehole in an earth formation via the use of array sonic borehole tools.

Before a borehole is drilled, virgin formation rocks are under stress due to overburden pressure. The removal of rock in a formation by the drilling of a borehole has a radial effect on the remaining formation around the borehole in the form of stress relief. The distribution of the stress components (i.e. radial, and angular) in the medium around the borehole varies depending on the type of rock which comprises the medium and the distance of the rock from the borehole, as well as e.g., the borehole pressure, mud weight, rock strength, pore pressure, cohesive strength, and the Poisson's ratio of the rock. Determinations of rock strength, pore pressure, and rock stress are all useful in predicting over-pressure zones, sanding and fracturing, all of which are critical in managing the production of hydrocarbons from the formation.

For the situation where the borehole pressure is greater than the in situ stress, the radial stress is at a minimum and the angular stress is at a maximum just outside the borehole wall in hard formations which do not crumble. However, in less hard formations such as unconsolidated sandstones, when a borehole is drilled, the rock surrounding the borehole crumbles and stress in the rock is redistributed. As seen in the prior art FIG. 1, the principle stress components $\sigma_r$, $\sigma_z$, and $\sigma_\theta$ in such a formation assume a profile where they are a function of radial distance rom the borehole wall. In the "plastic" zone which is closest to the borehole wall, the stress components $\sigma_z$, and $\sigma_\theta$ are essentially equal, while in the virgin zone which is unaffected by the borehole, and in the transition zone (which bridges the plastic zone and the virgin zone), each of the stress components assumes a different value.

In determining the stress profile of a disturbed zone (i.e., the plastic and transition zones), it is known that array acoustic tools may be used to determine a velocity profile and that the velocity profile will in turn yield a stress profile. Ray tracing techniques measuring transit times, and dispersion techniques measuring different phase velocities at different frequencies have been utilized; See, e.g. Brian Hornby and S. K. Chang, "A Cased Study of Shale and Sandstone Alteration Using a Digital Sonic Tool", *Proceedings of SPWLA 26th Annual Logging Symposium;* Dallas, Tex. (Jun. 17-20, 1985). While effective in some formations, these techniques are best suited to situations where velocity contrasts between acoustic waves at the borehole wall and in the virgin formation are large. The techniques, however, are not as effective in sandstones where velocity contrasts are small.

Besides using ray tracing techniques and dispersion techniques for measuring velocities, it is known that the amplitude of a compressional wave arrival varies in relationship to the thickness of the altered zone as well as in relationship to velocity contrast between the virgin and altered formations; see Tubman, Kenneth M.; "Effects of Borehole Alteration on Amplitudes of Full-Waveform Acoustic Logs" Borehole Geophysics II; Extended Abstract, SEG 55th Annual Meeting, Washington, D.C. (Oct. 6-10, 1985) pp. 46-46. The Tubman article suggests that there is a qualitative relationship between compressional wave arrival amplitudes and altered zone velocities, but does not provide or suggest a manner for making a quantitative determination.

SUMMARY OF THE INVENTION

It is therefore an object of the invention to provide methods utilizing amplitude measurements made by sonic tools for quantitatively measuring the velocity profile in a rock formation traversed by a borehole.

It is another object of the invention to utilize amplitude measurements in finding quantitative velocity profiles of low velocity contrast rock formations.

It is a further object of the invention to measure headwave amplitudes with an array sonic tool in order to determine actual velocity contrasts and perturbed zone thicknesses in formations surrounding a borehole.

In accord with the objects of the invention, a method utilizing a sonic tool for quantitatively determining a velocity profile in a rock formation traversed by a borehole broadly comprises measuring the first arrival compressional wave amplitude or energy as a function of transmitter-receiver spacing, and then using a least square fit in an iterative manner to adjust parameters of an assumed velocity profile so as to reduce to a minimum the difference of the amplitude or energy which would be obtained by the assumed velocity profile and the obtained measurements. The parameters so adjusted include a quantitative value (e.g. centimeters or inches) for the radius of the altered zone and the velocities in that altered zone. The velocities may then be used in known manners to determine the stresses in the formation.

According to another aspect of the invention, a calibration procedure for calibrating the relationship between stress and velocity may be used to help improve final stress determinations. The calibration procedure involves first measuring the sonic energy or amplitude under normal borehole pressure conditions and then pressurizing the well and taking the measurements again. The two measurements provide two different levels of formation stress distribution near the borehole as well as two sets of velocity profiles which are used to refine the relationship between stress and velocity in situ.

Because the methods of the invention utilize the amplitude or energy of the compressional wave envelope, the measurements so made are very sensitive to small velocity contrasts in the disturbed zone surrounding a borehole. The ability to quantify small velocity contrasts is particularly important in the analysis of sandstone formations or strata.

Other objects and advantages of the present invention will become evident upon reference to the detailed description in conjunction with the provided figures.

DETAILED DESCRIPTION OF THE PREFERRED EMBODIMENT

Figure 1:
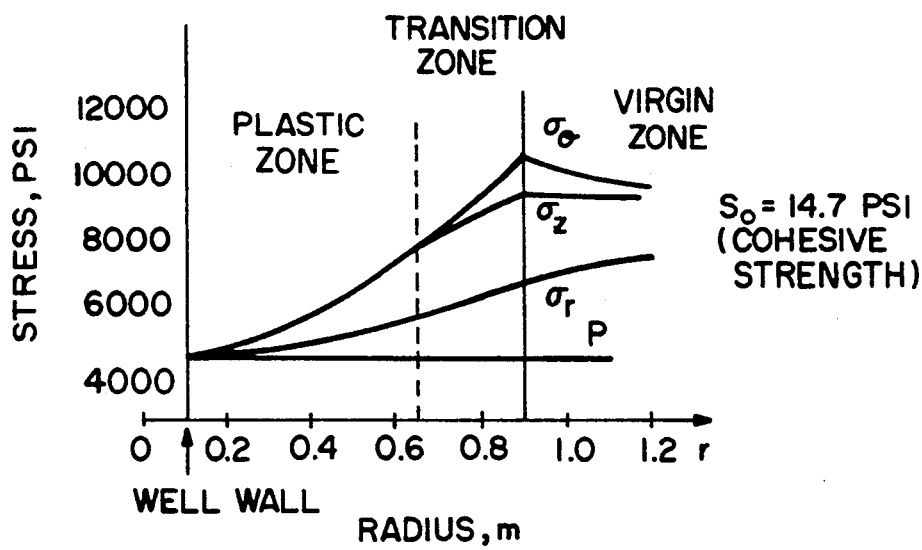
FIG. 1 is prior art showing stress components as a function of radius from a well wall in an unconsolidated sandstone formation.

In accord with the preferred embodiment of the invention, an array sonic tool such as disclosed in A. R. Harrison et al., "Acquisition and Analysis of Sonic Waveforms From a Borehole Monopole and Dipole Source . . . ": *SPE* 20557; 65th Ann. Technical Conference and Exhibition of the SPE, New Orleans, La. Sep. 23-26, 1990, is utilized to practice both the method and apparatus inventions. The preferred method set out in flow-chart form in FIG. 2 requires at step 20 that amplitude information of a compressional headwave be obtained from an array sonic tool. The term "amplitude information" as used herein is used in a broad sense to include peak amplitude, or the amplitude as determined by an analysis of total energy. The term "compressional headwave" as used herein is also used in a broad sense to include those compressional waves which are of significant amplitude and which closely follow the first arrival waves.

In determining the amplitude information required by step 20, the compressional wave envelope is first obtained from array sonic waveforms. This is accomplished in any of three preferred methods. First, the time and values of maximas (peaks) and minimas (valleys) of the waveform can be found. Then, the absolute values of the peaks and valleys may be taken to provide peak amplitudes for the wave envelope. Second, the absolute value or squared value of every point in the waveform may be taken with peak values of the resulting waveforms giving the envelope. If the waveform is squared, the square-root of the resulting waveform is preferably taken. A third method of obtaining the compressional wave envelope uses complex signals. If $P_n(t)$ is the pressure signal received by the n'th receiver in the array sonic tool, then the compressional wave envelope function E(t) is defined as:

$$E(t) = |P_n(t) + i\, h(t) \quad P_n(t)| = \sqrt{P_n^2(t) + [h(t) \quad P_n(t)]^2} \quad (1)$$

where $h(t) \oplus P_n(t)$ is the Hilbert transform of $P_n(t)$, $\oplus$ is a convolution operator, and h(t) is the kernel of the Hilbert transform which is given by $h(t) = -1/\pi t$.

Once the compressional wave envelope is obtained, the amplitude information (i.e. peak amplitude or energy) may be derived therefrom in any of several manners. For example, a peak amplitude may be taken from the envelope by finding the maximal values of the envelope for the first peak after the compressional arrival and before the shear or Stonely wave (where there is no shear) arrival. Or, the compressional wave envelope can be integrated to provide a total energy amplitude. A third manner of obtaining amplitude information is to use the entire envelope as it is so that peak amplitude, integrated energy, and the shape of the envelope will all be available.

Returning to FIG. 2, the second step 30 of the method invention is to gather relevant information regarding the borehole and the formation. In particular, compressional wave velocities of the borehole mud and the virgin formation are obtainable via long spaced sonic tools, and/or via processing array sonic data such as obtained by the tool of the previously referenced article by A. R. Harrison et al. (SPE 20557). Likewise, information regarding virgin formation density, borehole diameter, and virgin formation shear wave velocities is obtainable via tools known to those skilled in the art.

Step 40 of the method invention requires a selection of a proposed velocity profile $v_c(r)$ for the formation as a function of radial distance from the borehole, including proposed parameters such as the radial depth of the altered zone, and the velocity. The selection of a proposed velocity profile is preferably made with some knowledge of the formation properties, although such is not required. In particular, the lithology of the formation is often known because borehole tools which help determine lithology are run downhole. With previous knowledge of lithology, certain velocity profiles may be most reasonable.

As seen in FIGS. 3a-3e, there are several different velocity profile models from which to choose. The velocity profile of FIG. 3a which is most common to shale formations is a step profile defined according to the following:

$$v(r) = v_c(\text{virgin formation}), r > r_a \quad (2)$$
$$v_{ca}(\text{altered zone}), r_a > r > r_b$$
$$v_c(\text{mud}), r_b > r$$

where $r_b$ is the borehole radius and $r_a$ is the outer radius of the altered zone. With the step profile, $r_a$ and $v_{ca}$(altered zone) are the unknown parameters to be determined, as $v_c$(virgin formation) and $v_c$(mud) are typically known from the information gathered at step 30. It will be appreciated that the step profile can be extended into a multi-step profile with the provision of additional unknown parameters.

Figure 3A:
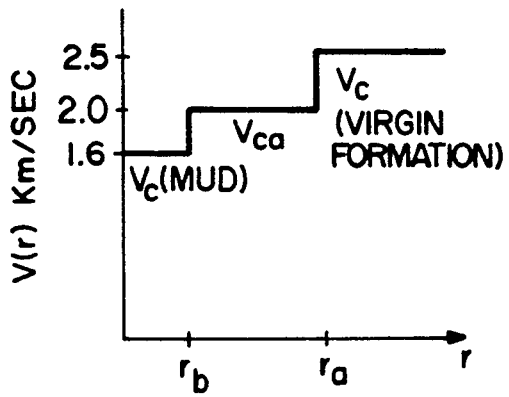
FIGS. 3a-3e are typical velocity profile graphs showing velocity versus radius from a borehole for formations having a step profile, a linear profile, a quadratic profile, a spline profile, and a radius square inverse profile respectively.
Figure 3B:
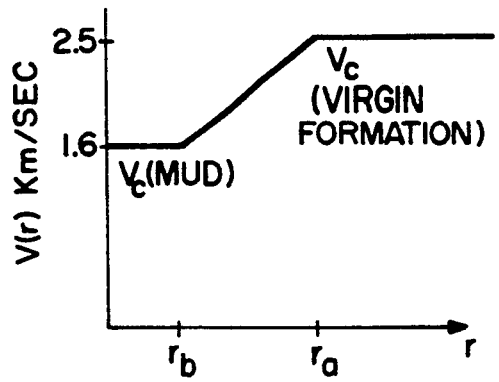

A second velocity profile is shown in FIG. 3b. In FIG. 3b, linear profiles which are common to sandstone formations are defined according to:

$$v(r) = v_c(\text{virgin formation}), r > r_a \quad (3)$$
$$v_c + (r - r_a)v'\ \ r_a > r > r_b$$
$$v_c(\text{mud}), r_b > r$$

In the linear profile of FIG. 3b, v' and $r_a$ are the unknown parameters to be determined.

Figure 3C:
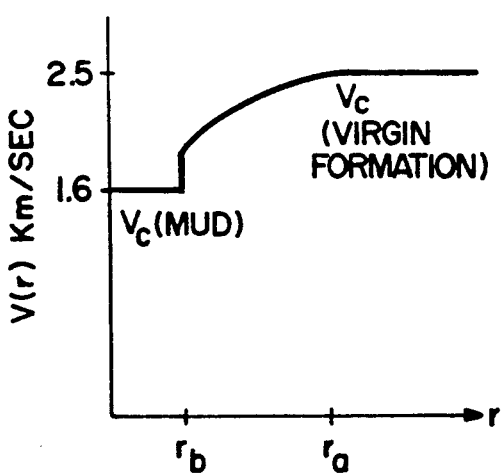

A quadratic velocity profile is shown in FIG. 3c and is defined according to $$v(r) = v_c(\text{virgin formation}), r > r_a \quad (4)$$
$$v_c + (r - r_a)v' + (r - r_a)^2 v'', r_a > r > r_b$$
$$v_c(\text{mud}), r_b > r$$

In the quadratic velocity profile, v', v", and $r_a$ are the unknown parameters to be determined.

Figure 3D:
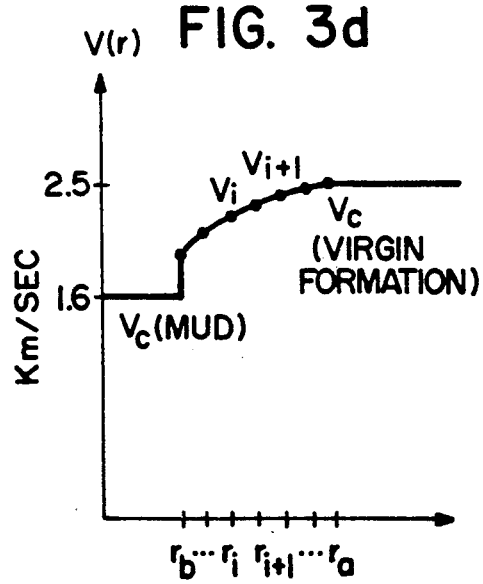

A fourth velocity profile is a piecewise polynomial or spline shown in FIG. 3d which is defined according to $$v(r) = v_c(\text{virgin formation}), r > r_a \quad (5)$$

$$\sum_{i=1}^{N} v_{ci} B_i(r), r_a > r > r_b$$

$$v_c(\text{mud}), r_b > r$$

In the spline profile $B_i$ is the interpolating polynomial. (See, P. M. Prenter, *Splines and Variational Methods*, Wiley Interscience Series (John Wiley & Sons) 1975. The unknown parameters to be determined are $v_{ci}$, i=1,2,...,N, and $r_a$. The discretization points ri, i=2, ...,N-1 can be set at constant or non-uniform intervals as desired.

Figure 3E:
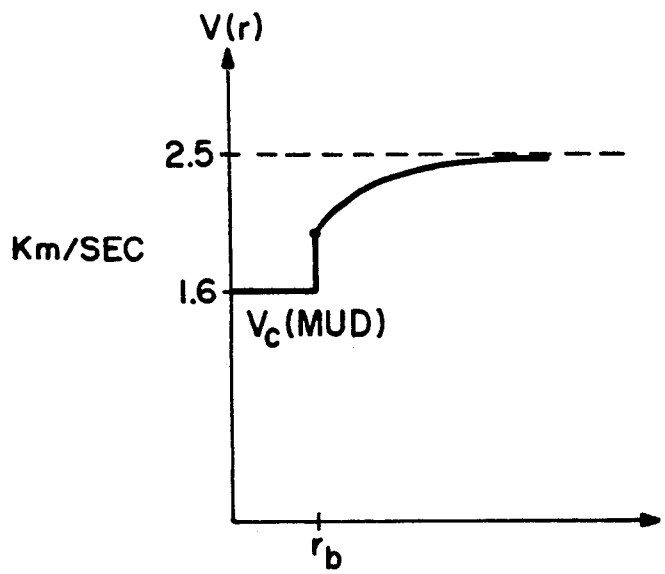

A fifth velocity profile is helpful for describing a borehole under stress is shown in FIG. 3e and defined according to $$v(r) = v_c + (r_b^2/r^2)v', r > r_b \quad (6)$$

$$v_c(\text{mud}), r_b > r$$

In this radius square inverse profile which is essentially a modification of the quadratic velocity profile, the unknown parameter is v'.

Figure 2:
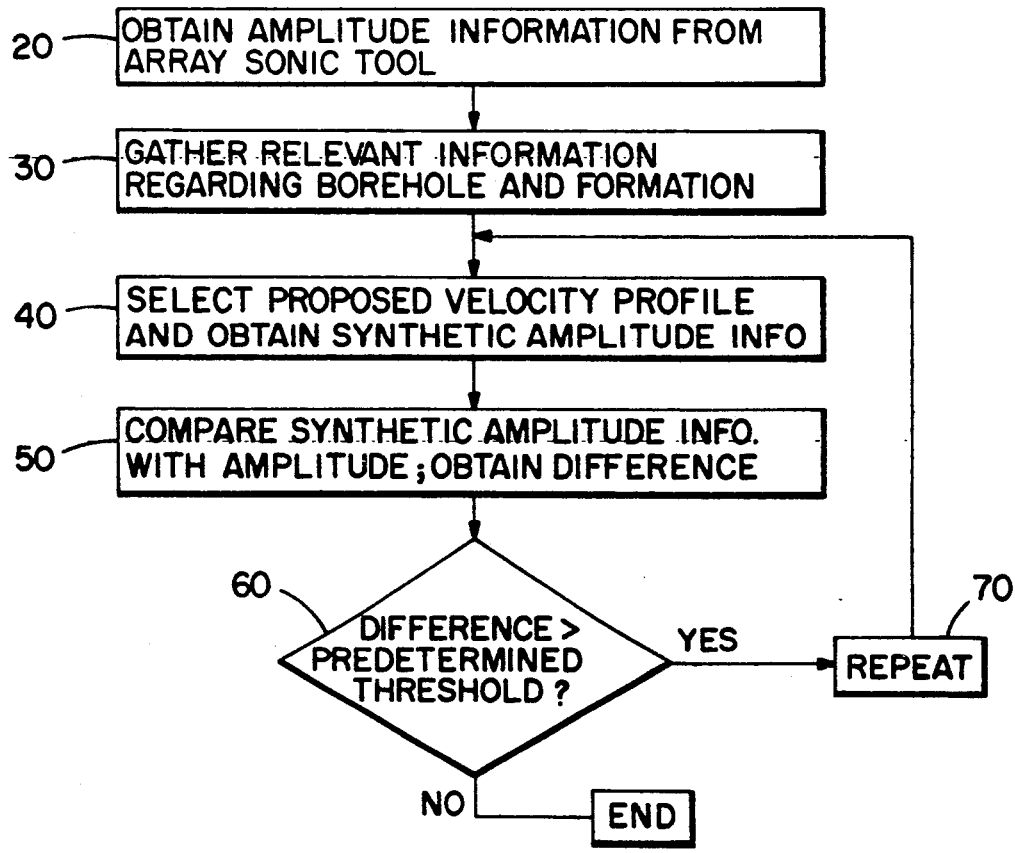
FIG. 2 is a flow chart of the preferred method of the invention.

Once the proposed velocity profile is chosen, a theoretical model for an array sonic borehole tool is utilized at step 50 of FIG. 2 to generate synthetic waveforms and to obtain synthetic amplitude data therefrom. Various such models for generating synthetic waveforms and obtaining synthetic amplitude data are known. A preferred model is that set forth in L. J. Baker, "The Effect of the Invaded Zone on Full Wavetrain Acoustic Logging": *Geophysics* Vol. 49, No. 6; (June 1984 pp. 796-809), which is expanded by subdividing the altered zone into a plurality of sub-zones. A profile is applied by assigning parameters to the sub-zones, and including enough sub-zones such that the velocity profile of the altered zone is well approximated. Another model which can be utilized via expansion is a ray tracing model set forth in a Master's Thesis by David Scheibner, *A Ray Model for Head Waves in a Fluid-Filled Borehole*; Rice University, Dep't of Electrical Engineering (April 1982). The model is expanded by including an altered zone. Additional techniques are set forth in Tsang, Leung, and Dennis Rader, 1979, "Numerical Evaluation of the Transient Acoustic Waveform Due to a Point Source in a Fluid-Filled Borehole": Geophysics, Vol. 44, No. 10, pp. 1706-1720; M. Schoenberg, et al., "Space-Time Dependence of Acoustic Waves in a Borehole", *Journal of the Acoustical Society of America* Vol. 70, No. 12, (1981); White, J. E. and R. E. Zechman, 1968, "Computed Response of an Acoustic Logging Tool": *Geophysics Vol.* 33, No. 2 (pp 302-310); and W. L. Roever et al., "Acoustic Waves from an Impulsive Source in a Fluid-Filled Borehole": *Journal of the Acoustical Society of America*, Vol. 55, No. 6 (pp 1144-1157).

Figure 4:
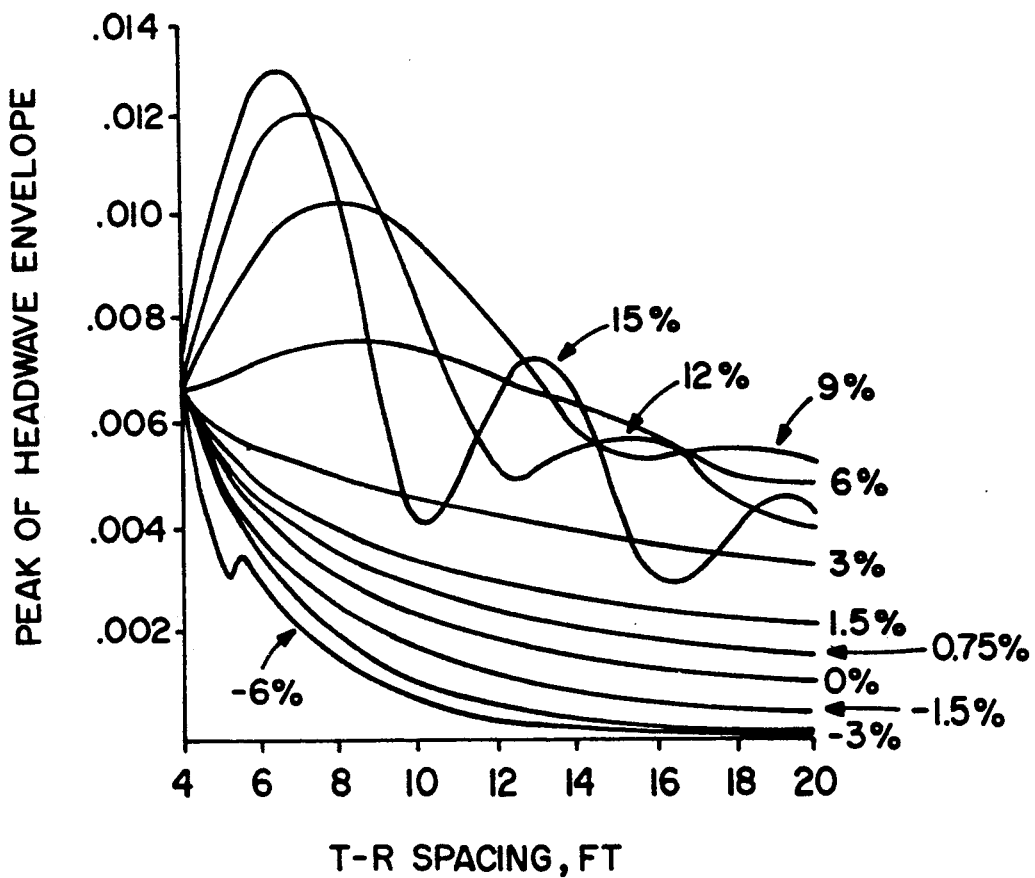
FIG. 4 is a graph showing headwave amplitudes versus transmitter-receiver spacing for various velocity contrasts in a formation.

Regardless of the model utilized, in obtaining the amplitude data, a relationship between sonic velocity and resulting amplitudes in an array sonic tool must be available. FIG. 4 provides an example of such information. FIG. 4 is a scaled graph showing peak amplitudes of headwave envelopes versus transmitter-receiver (T-R) spacing for Various Velocity contrasts $\Delta v/v$) in a linear velocity profile formation where $\Delta v=(r_a-r_b)V'$, $v=V_c$. In FIG. 4, the pressure is measured in Pascals, and the source used to provide the signal was a unit source; i.e. a free field acoustic point source having an acoustic output of one Pascal at one meter. If a proposed velocity profile and a proposed velocity parameter are chosen, the velocity contrast is defined. Theoretical amplitudes then may be determined for the specific transmitter to receiver (T-R) spacing. It should be appreciated that other graphs relating total energy of the headwave envelope, T-R spacing, and velocity contrasts can be generated if the total energy amplitude approach is utilized.

Once the synthetic amplitude information for a proposed formation with the proposed velocity profile is available, at step 50 of FIG. 2, the amplitude results of the theoretical model are compared to the amplitude information obtained at step 20 with either the theoretical model results being calibrated to the source strength of the actual tool or vice versa. The comparison of amplitudes can be as simple as subtracting peak values for each receiver of the array to provide a series of differences and summing the squares of the differences. Or, comparisons can be made by integrating over time if entire envelopes are used. Regardless, if the difference obtained at 60 is greater than a predetermined threshold set by the user as determined at 70, the parameters of the velocity are readjusted at 40 preferably in accord with the Newton-Ralphson method. New data for the new parameters are obtained by the theoretical model at step 50, and differences in values are again calculated at step 60. At step 70, the difference is compared to the threshold again, and the least square method process repeats until the difference is smaller than the preset threshold. At that time, parameters of the velocity profile of the formation are deemed determined, including the radius of the altered zone, and the velocity as a function of radial distance from the borehole.

Because it is possible that the proposed velocity profile chosen at step 40 does not correspond with the actual velocity profile, if desired, steps 50, 60, and 70 of FIG. 2 can be carried out with a plurality of velocity profiles. The best fit of all of the data sets could then be utilized not only to establish the parameters of the velocity profile, but to identify the correct velocity profile as well.

If desired, multiple sets of data can be acquired by driving the transmitter with pulses that have different frequency spectra. The velocity profile parameters can be obtained by matching the synthetic amplitude with the measured data for the plurality of waveform frequencies. Particularly, since each receiver will have different amplitudes relating to different frequencies, it will be possible to fit $A_1(f_1)$, $A_2(f_2)$, $A_3(f_3)$... to a model which is similarly arranged to minimize differences, where $A_n$ is the amplitude at the n'th frequency $f_n$.

Figure 5:
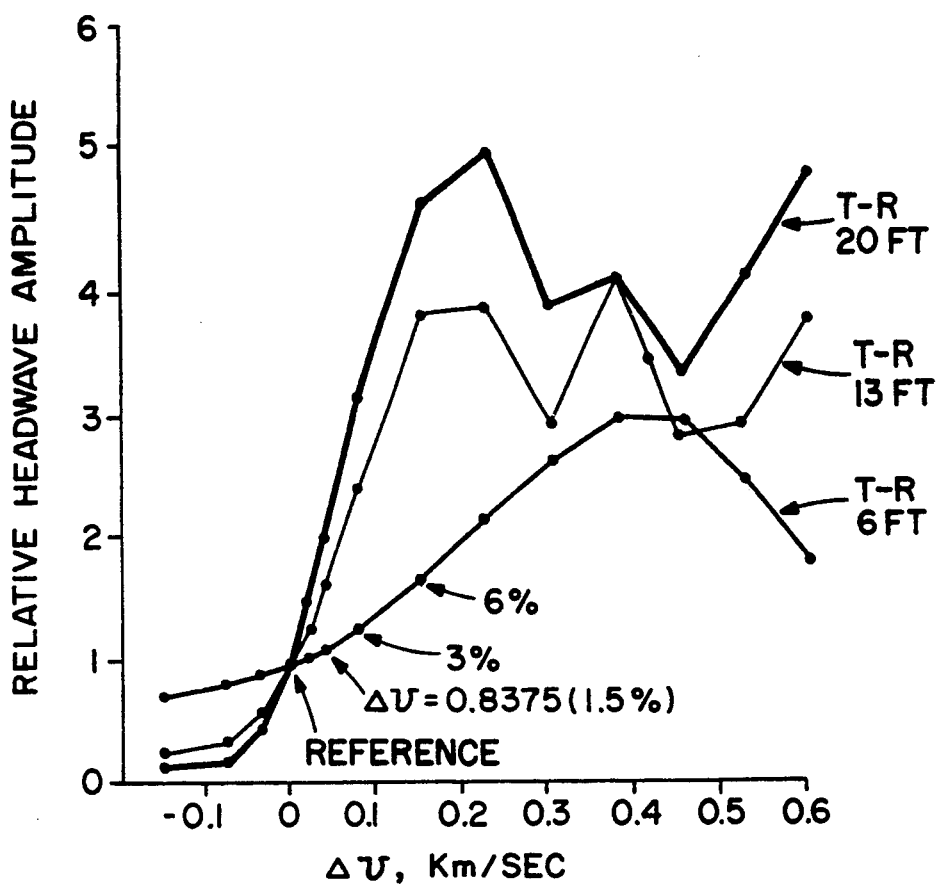
FIG. 5 is a graph showing the relative headwave amplitudes versus velocity contrasts for various transmitter-receiver spacings.

The use of headwave amplitude measurements permits an accurate determination of extremely small velocity contrasts in the disturbed formation. As seen in FIG. 5, in a typical formation of average velocity of 2.5 km/sec, where the velocity contrasts are less than 0.2 km/sec (i.e. less than 8%), the measured amplitude can increase anywhere between 100% and 400% depending on the T-R spacing. Thus, for formations of relatively low velocity contrasts, the use of amplitude measurements as a means for gauging velocity contrast increases the measurement resolution about twelve to fifty times depending on the T-R spacing.

The velocity profile as determined according to the above-described method is useful in analyzing stress and rock strength near the borehole. In shales, the radial extent of the shale alteration can be monitored over a period of days as the borehole is being drilled. This information can be critical for borehole stability control. In consolidated sandstones, carbonates, and other hard rocks, the velocity profile is caused by nonlinear elasticity. The stress distribution near the borehole is then defined according to Timoshenko and Goodier; *Theory of Elasticity*, McGraw-Hill, (1934); as $$\sigma_{rr} = \sigma_o - (r_b^2/r^2)(\sigma_o - p_m) \quad (7)$$
$$\sigma_{\theta\theta} = \sigma_o + (r_b^2/r^2)(\sigma_o - p_m) \quad (8)$$
$$\sigma_{zz} = \sigma_o \quad (9)$$

where $\sigma_{rr}$, $\sigma_{\theta\theta}$, and $\sigma_{zz}$, are the radial, angular, and axial stresses, $\sigma_o$ is the in-situ stress in the formation, and $p_m$ is the mud pressure (i.e. the integrated weight above the measurement depth).

The relationship between stress components and velocity may be obtained from laboratory measurements of core samples under confining pressure $\sigma_o$ and under triaxial stress. Under triaxial stress, the velocity in one direction can be measured. It will be appreciated that the velocity in any direction is a function of the stress components. Taking $v_o$ as the velocity where all three stress components (x, y, and z) are equal, $$v_o = v_z(\sigma_o, \sigma_o, \sigma_o) \quad (10)$$

when the sample is stressed, its velocity can be written as $$v(\sigma_o - \delta\sigma, \sigma_o + \delta\sigma, \sigma_o) \quad (11)$$

which in turn can be approximated by $$v_o + v_\sigma \delta\sigma \quad (12)$$

where $v_\sigma$ is the velocity divided by stress. Using equations (7) or (8) to find $\delta\sigma$, and substituting into equation (12), it will be seen that the velocity can be expressed according to $$v \approx v_o + (r_b^2/r^2)\ \sigma_o - p_m)\ V_\sigma \quad (13)$$

Expression (13) corresponds well with the fifth velocity profile discussed above when $v_o$ is set equal to $v_c$, and $(\sigma_o - p_m) v_{94}$ is set equal to $v'$. It will also be appreciated by those skilled in the art, that if a Taylor series of $r_b^2/r^2$ is taken, and only the first term of the Taylor series is utilized, expression (13) would correspond well to the second velocity profile discussed above. Further, if two terms of the Taylor series are used, the expression (13) would correspond well to the third velocity profile discussed above. When splines are used, expression (13) corresponds well to the fourth velocity profile discussed above.

In unconsolidated sandstones, there is a plastic zone and a transition zone between the borehole and the virgin formation. The velocity of sound waves is perturbed by plastic deformation in the plastic and transition zones. The near-borehole stress profile in unconsolidated sands is described in R. Risnes, et al., "Sand Stresses Around a Wellbore", SPE 9650; Middle East Oil Technical Conference of the Society of Petroleum Engineers in Manama, Bahrain, Mar. 9-12 1981.

Recapitulating, in accord with the method invention, parameters of a velocity profile can be determined by obtaining amplitude information from a sonic tool, gathering relevant information regarding the borehole and the formation, selecting a proposed velocity profile and obtaining synthetic amplitude information therefrom, comparing the synthetic amplitude information with the amplitude information obtained from the borehole tool, and iteratively changing the synthetic amplitude by varying the parameters of the velocity profile until a good fit is obtained. Once the velocity profile and the parameters thereof are obtained, a stress profile of the formation can be obtained by relating the velocity to the stress utilizing lab measurements as discussed above with reference to relationships (10) through (13). From the stress profile, the shear strength of the rock formation can be obtained as well as failure parameters which will permit the practitioner to avoid undesired sanding and fracturing.

According to another aspect of the invention, a calibration procedure for calibrating the relationship between stress and velocity may be used to help improve final stress determinations. The calibration procedure involves first measuring the sonic energy or amplitude under normal borehole pressure conditions and then pressurizing the well and taking the measurements again. The two measurements provide two different levels of formation stress distribution near the borehole as well as two sets of velocity profiles; and the comparison between the two sets of velocity profiles and stress distributions can be used to refine the relationship between stress and velocity in situ.

Figure 6:
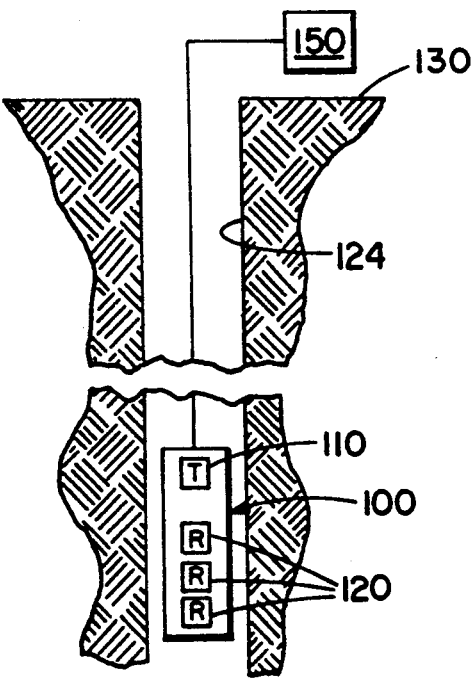
FIG. 6 is cross-sectional schematic representation of the apparatus of the invention.

The apparatus of the invention is related closely to the above-described methods, and a representation thereof is seen in FIG. 6. An array sonic tool 100 such as disclosed in C. F. Morris et al., "A New Sonic Array Tool for Full Waveform Logging": SPE 13285; 59th Ann. Tech. Conference and Exhibition, Houston Tex. (Sep. 16-19, 1984), or in A. R. Harrison et al., "Acquisition and Analysis of Sonic Waveforms From a Borehole Monopole and Dipole Source . . . ": SPE 20557; 65th Ann. Technical Conference and Exhibition of the SPE, New Orleans, La. Sep. 23-26, 1990, includes a transmitter 110 and a plurality of receivers 120, and is utilized in a borehole 124 to detect sonic waveforms. The waveform information is then processed in a processor, computer, or the like, either downhole or at the surface of the formation 130 to provide the wave envelope and amplitude information as set forth above. The choice of velocity profiles is made either by one skilled in the art or an expert system which utilizes information regarding the formation such as lithology which was obtained in other manners. Or as aforementioned, if desired, all velocity profiles may be chosen for analysis. Based on the chosen velocity profile, amplitude information is generated by a suitably programmed processor or computer 150, e.g., a VAX manufactured by Digital Equipment Corp. of Brainard, Mass., which is typically located on the formation surface or in a laboratory. Likewise, the comparison of the synthetic and measured amplitude information, and the least squares search for the parameters of the velocity profile are preferably conducted by a suitably programmed computer.

There have been described and illustrated herein methods and apparatus for investigating altered zones of formations adjacent boreholes. While particular embodiments have been described, it is not intended that the invention be limited thereto, as it is intended that the invention be as broad in scope as the art will allow. Thus, it should be appreciated that while relationships between the amplitude of the peak of the headwave envelope, the transmitter-receiver spacing, and the velocity contrasts are set forth in FIG. 4, the invention is not limited to using peak amplitudes. Thus, relationships between headwave envelope energy, T-R spacings, and velocity contrasts are derivable by those skilled in the art through straight-forward experimentation. Also, while particularly velocity profiles were set forth as the most likely candidates for formations, it will be appreciated that other velocity profiles could be used and that the method and apparatus invention applies to any profile, provided that enough information is gathered to solve for the number of unknown variables introduced thereby. Therefore, it will be apparent to those skilled in the art that yet other modifications may be made to the invention as described without departing from the spirit and scope of the claimed invention.

We claim:
1. A method for investigating properties of a formation traversed by a borehole along a length of said borehole by using a sonic borehole tool, said formation having an altered zone adjacent said borehole and an unaltered zone beyond said altered zone, said method comprising:
   a) obtaining amplitude information of a compressional headwave via use of said sonic borehole tool;
   b) selecting a proposed radial velocity profile for said formation, said radial velocity profile including as parameters a radius of said altered zone, and acoustic velocities of said altered zone, and obtaining synthetic amplitude information corresponding to said selected proposed radial velocity profile;
   c) comparing said compressional headwave amplitude information with said synthetic amplitude information to obtain an amplitude difference;
   d) adjusting values for said radial velocity profile parameters until said amplitude difference is less than a predetermined threshold, wherein a quantitative determination of said parameters is thereby made to provide a determined radial velocity profile of said formation.

2. A method according to claim 1, wherein:
said step of obtaining amplitude information of a compressional headwave comprises obtaining the compressional wave envelope and determining a peak amplitude therefrom.

3. A method according to claim 1, wherein:
said step of obtaining amplitude information of a compressional headwave comprises obtaining the compressional wave envelope and determining a total energy amplitude therefrom.

4. A method according to claim 1, wherein:
said sonic tool comprises a sonic wave transmitter and a plurality of sonic wave receivers spaced at different spacings from said sonic wave transmitter, and
values for said velocity profile parameters are obtained by matching the synthetic and compressional headwave amplitudes over said plurality of sonic wave receivers.

5. A method according to claim 1, wherein:
said sonic tool comprises a sonic wave transmitter which transmits sonic waves of different frequencies,
said amplitude information of a compressional headwave comprises amplitude information for compressional headwaves of different frequencies,
said synthetic amplitude information comprises synthetic amplitude information as a function of frequency, and
wherein a plurality of amplitude differences are obtained for different frequencies and values for said velocity profile parameters are adjusted until the amplitude differences meet predetermined criteria.

6. A method according to claim 1, wherein:
said borehole is filled with mud, and
said velocity profile chosen at step b) is a linear velocity profile defined according to $$v(r) = v_c(\text{virgin formation}), r > r_a$$
$$v_c + (r - r_a)v' \quad r_a > r > r_b$$
$$v_c(\text{mud}), r_b > r$$

wherein
v(r) is the acoustic velocity of said formation as a function of radius r from said borehole,
$r_b$ is the radius of said borehole,
$v_c$(virgin formation) is the acoustic velocity in said unaltered zone of said formation,
$v_c$(mud) is the acoustic velocity in said mud, and
$(r - r_a)v'$ is the acoustic velocity function in said altered zone of said formation, where $r_a$ is the radius of said altered zone of said formation, and where values for $r_a$ and $v'$ are unknown.

7. A method according to claim 6, wherein:
said step of adjusting values for said velocity profile parameters is carried out according to a least squares fit method.

8. A method according to claim 6, wherein:
said step of obtaining amplitude information of a compressional headwave comprises obtaining the compressional wave envelope and determining a peak amplitude therefrom.

9. A method according to claim 6, wherein:
said step of obtaining amplitude information of a compressional headwave comprises obtaining the compressional wave envelope and determining a total energy amplitude therefrom.

10. A method according to claim 1, wherein:
said borehole is filled with mud, and
said velocity profile chosen at step b) is a step profile defined according to $$v(r) = v_c(\text{virgin formation}), r > r_a \qquad (2)$$
$$v_{ca}(\text{altered zone}), r_a > r > r_b$$
$$v_c(\text{mud}), r_b > r$$

wherein
v(r) is the acoustic velocity of said formation as a function of radius r from said borehole,
$r_b$ is the radius of said borehole,
$v_c$(virgin formation) is the acoustic velocity in said unaltered zone of said formation,
$v_2$(mud) is the acoustic velocity in said mud, and
$v_{ca}$(altered Zone) is the acoustic velocity in said altered zone of said formation, where $r_a$ is the radius of said altered zone of said formation, and where values for $r_a$ and $v_{ca}$(altered zone) are unknown.

11. A method according to claim 10, wherein:
said step of adjusting values for said velocity profile parameters is carried out according to a least squares fit method.

12. A method according to claim 10, wherein:
said step of obtaining amplitude information of a compressional headwave comprises obtaining the compressional wave envelope and determining a peak amplitude therefrom.

13. A method according to claim 10, wherein:
said step of obtaining amplitude information of a compressional headwave comprises obtaining the compressional wave envelope and determining a total energy amplitude therefrom.

14. A method according to claim 1, wherein
said borehole is filled with mud, and
said velocity profile chosen at step b) is a quadratric profile defined according to $$v(r) = v_c(\text{virgin formation}), r > r_a$$
$$v_c + (r - r_a)v' + (r - r_a)v'', r_a > r > r_b$$
$$v_c(\text{mud}), r_b > r$$

wherein
v(r) is the acoustic velocity of said formation as a function of radius r from said borehole,
$r_b$ is the radius of said borehole,
$v_c$(virgin formation) is the acoustic velocity in said unaltered zone of said formation,
$v_c$(mud) is the acoustic velocity in said mud, and
$v_c + (r-r_z)v' + (r-r_a)v''$ is the acoustic velocity function in said altered zone of said formation, where $r_a$ is the radius of said altered zone of said formation, and where values for $r_a$, v', and v'' are unknown.

15. A method according to claim 14, wherein:
said step of adjusting values for said velocity profile parameters is carried out according to a least squares fit method.

16. A method according to claim 14, wherein:
said step of obtaining amplitude information of a compressional headwave comprises obtaining the compressional wave envelope and determining a peak amplitude therefrom.

17. A method according to claim 14, wherein:
said step of obtaining amplitude information of a compressional headwave comprises obtaining the compressional wave envelope and determining a total energy amplitude therefrom.

18. A method according to claim 1, wherein:
said borehole is filled with mud, and
said velocity profile chosen at step b) is a profile defined according to $$v(r) = v_c + (r_b^2/r^2)v', r > r_b$$
$$v_c(\text{mud}), r_b > r$$

wherein
v(r) is the acoustic velocity of said formation as a function of radius r from said borehole,
$r_b$ is the radius of said borehole,
$v_c$(mud) is the acoustic velocity of said mud, and
$v_c + v'(r_b^2/r^2)$ is the acoustic velocity function in said formation beyond said borehole, where the value for v' is unknown, and wherein in said step of adjusting values for said velocity profile parameters, said radius of said altered zone is not adjusted.

19. A method according to claim 18, wherein:
said step of adjusting v' is carried out according to a least squares fit method.

20. A method according to claim 18, wherein:
said step of obtaining amplitude information of a compressional headwave comprises obtaining the compressional wave envelope and determining a peak amplitude therefrom.

21. A method according to claim 18, wherein:
said step of obtaining amplitude information of a compressional headwave comprises obtaining the compressional wave envelope and determining a total energy amplitude therefrom.

22. A method according to claim 1, Wherein:
said borehole is filled with mud, and
said velocity profile chosen at step b) is a spline profile defined according to $$v(r) = v_c(\text{virgin formation}), r > r_a$$
$$\sum_{i=1}^{N} v_{ci}B_i(r), r_a > r > r_b$$
$$v_c(\text{mud}), r_b > r$$

wherein
v(r) is the acoustic velocity of said formation as a function of radius r from said borehole,
$v_c$(virgin formation) is the acoustic velocity in said unaltered zone of said formation,
$r_b$ is the radius of said borehole,
$B_i$ is an interpolating polynomial,
$v_c$(mud) is the acoustic velocity of said mud, and $$\sum_{i=1}^{N} v_{ci}B_i(r)$$

is the acoustic velocity function in said formation beyond said borehole, where $r_a$ is the radius of said altered Zone of said formation, and where the values for $r_a$ and $v_{ci}$, i=1,2, ... N are unknown.

23. A method according to claim 22, wherein:
said step of adjusting values for said velocity profile parameters is carried out according to a least squares fit method.

24. A method according to claim 22, wherein:
said step of obtaining amplitude information of a compressional headwave comprises obtaining the compressional wave envelope and determining a peak amplitude therefrom.

25. A method according to claim 22, wherein:
said step of obtaining amplitude information of a compressional headwave comprises obtaining the compressional wave envelope and determining a total energy amplitude therefrom.

26. A method according to claim 1, wherein said method is carried out with said borehole mud at a first pressure:
repeating steps a) through d) with said borehole mud at a second pressure to obtain second quantitative determinations of said parameters, and
calibrating by comparing said quantitative determinations of said parameters made at said first and at said second pressure.

27. An apparatus for investigating properties of a formation traversed by a borehole along a length of said borehole, said formation having an altered zone adjacent said borehole and an unaltered zone beyond said altered zone, said apparatus comprising:
   a) transmitter means for emitting sonic waves into said formation;
   b) a plurality of sonic wave receiver means spaced along an axis of said apparatus parallel to the axis of said borehole, for receiving sonic waves which were emitted by said transmitter means and which travelled through said formation, and for measuring headwave amplitudes of said sonic waves;
   c) processing means, coupled to said plurality of said sonic wave receiver means for quantitatively determining from said headwave amplitudes values for parameters relating to a radial velocity profile of said altered zone.

28. An apparatus according to claim 27, wherein:
said parameters relating to said radial velocity profile of said altered zone include the radial extent of said altered zone, and the sonic velocity of said altered zone as a function of radius from said borehole.

29. An apparatus according to claim 28, wherein:
said processing means includes
   means for storing indications of a proposed radial velocity profile for said formation, said proposed radial velocity profile including as parameters a radius of said altered zone, and sonic velocities of said altered zone, said proposed radial velocity profile, and said indications including at least synthetic amplitude information corresponding to a chosen of said proposed radial velocity profiles,
   means for comparing said measured headwave amplitudes of said sonic waves with said synthetic amplitude information to obtain an amplitude difference, and
   means for adjusting values for parameters of said proposed radial velocity profile for said formation until said amplitude difference is less than a predetermined threshold, thereby providing quantitative values for said parameters relating to said radial velocity profile of said altered zone.

30. An apparatus according to claim 29, wherein:
said proposed radial velocity profile is chosen from one of a group consisting of a step profile, a linear profile, a quadratic profile, a spline profile, and a radius square inverse profile.

* * * * *